Patented Jan. 12, 1937

2,067,452

UNITED STATES PATENT OFFICE 2,067,452

HEXYL CATECHOL AND PROCESS OF PRODUCING IT

Lucas P. Kyrides, Webster Groves, Mo., assignor, by mesne assignments, to Monsanto Chemical Company, a corporation of Delaware No Drawing. Application October 19, 1931
Serial No. 569,861

2 Claims. (Cl. 260—154)

This invention relates to a novel class of phenolic compositions characterized in that they are derivatives of ortho dihydroxybenzene (catechol) and it contemplates the use of this class of compositions as a germicide and general disinfectant.

Heretofore aliphatic derivatives of resorcinol, such as hexylyl resorcinal and hexyl resorcinol have been proposed as general disinfecting agents. The materials are made conveniently by reacting caproic acid with resorcinol in the presence of $ZnCl_2$ to form the corresponding ketone, namely, hexylyl resorcinol. The ketone in turn may be reduced by the Clemmensen reaction to form the alkyl derivative, hexyl resorcinol.

According to the present invention, acyl and alkyl catechol compositions have been synthesized by an analogous method of preparation and found to have inordinate germicidal action as compared to corresponding phenol and resorcinol compositions. Thus for example, whereas hexyl resorcinol possesses a phenol coefficient, as measured by the Rideal-Walker method, of 60–70, hexyl catechol possesses a phenol co-efficient under the same conditions of 100–200.

In general, these compositions may be employed in a manner analogous to the corresponding resorcinol compositions in mouth washes, toothpastes, or general disinfectants for internal and external use. For this purpose, suitable solvents, such as aqueous glycerol, glycol and alcohol mixtures, may be employed. Other ingredients may be added, if desired.

One method of preparing the ester consists in reacting 2 mols of the acid chloride with 1 mol. of catechol, preferably under reflux to effect return of the acid chloride until the evolution of hydrogen chloride ceases. The residue is distilled under reduced pressures; the range of their boiling points is indicated by the following:

Catechol diacetate_____ 142–143° C. at 9 mm.
Catechol di-n-valerate_____ 165° C. at 9 mm.
Catechol di-caproate_____ 181–183° C. at 9 mm.

The esters so formed may be rearranged in the manner described by Rosemond and Lohfert (Ber. Vol. 61, page 2601). This method consists briefly in dissolving the catechol ester in nitrobenzene and effecting the rearrangement with the aid of an anhydrous aluminum chloride at a temperature of 100°–110° C. However, in lieu of nitrobenzene, one may employ acetylene tetrachloride to advantage. The resulting product may be crystallized conveniently from benzene.

If desired, the acyl derivative may be made directly by reacting catechol with an aliphatic acid in the presence of zinc chloride. In general, the yields of the acyl product are not as good as in the two-step process.

The reduction of the ketones to the corresponding alkyl derivatives is effected by the Clemmensen method, which consists in causing the ketone to react with amalgamated zinc and hydrochloric acid. If desired, the acid may be diluted with alcohol in order to increase the solvent power of the ketone in the reducing medium. The range of the boiling points of the alkyl derivatives is of the order indicated:

Ethyl catechol_____ 145–150° C. at 10 mm.
Butyl catechol_____ 154–155° C. at 10 mm.
Normal amyl catechol____ 152–153° C. at 9 mm.
Iso-amyl catechol_____ 160–162° C. at 10 mm.
Hexyl catechol_____ 180–181° C. at 12 mm.

Although the general reactions employed in practicing the present invention are known and the procedure for synthesizing the various compositions will be apparent to those skilled in the art from the foregoing description, there is set forth hereafter an example of a procedure which may be employed in manufacturing hexyl catechol, one of the compounds falling within the class contemplated by the present invention.

The di-caproate ester of catechol is prepared by adding 2 mols of hexylyl chloride to 1 mol. of catechol, under reflux to effect return of the acid chloride. After the initial evolution of HCl has subsided, the mixture is heated gently until no more HCl gas is evolved. The residue, consisting principally of catechol di-caproate, is distilled under reduced pressures. The rearrangement to the ketone form is effected by dissolving 2 gram mols of aluminum chloride and 1 gram mol. of the di-caproate ester in 2500 cc. of acetylene tetrachloride and heating the mixture for 2 hours at 100°–110° C. Thereafter the mixture is quenched in ice and dilute hydrochloric acid, and the organic liquid layer separated and washed with water. The solvent is then removed by distillation. The ketone product may be refined either by distillation at reduced pressures, or by recrystallization from benzene. Upon recrystallization from benzene, the product will be found to have a melting point of 91°–93° C.

The hexylyl catechol so formed is converted to hexyl catechol by refluxing for 24 hours, a mixture consisting of 1 part of the ketone, 5 parts of amalgamated zinc and 15 parts of muriatic acid which has been diluted with an equal volume of water. After 24 hours, the oily layer consisting essentially of the alkyl product is separated from the aqueous fraction and purified by distillation. It will be found to boil at approximately 180-181° C. at 12 mm. pressure.

Substituted alkyl catechol compositions in which the alkyl group contains a greater number of carbon atoms than hexyl catechol are made conveniently by an analogous process and possess analogous properties.

The ketone as well as the alkyl form possess strong disinfecting properties.

From the foregoing description, it will be apparent that the present invention affords a novel class of compositions which possess high phenol co-efficients and may, therefore, be used in very small amounts without impairing their efficacy as germicides and general disinfectants. Although representative examples of the application of the principles of my invention have been set forth it should be apparent that the invention is not so limited, but extends to other catechol derivatives containing aliphatic side chains, whether straight or branched, preferably those having more than one carbon atom, and I desire, therefore, that the invention be limited only as indicated in the apppended claims.

What I claim is:

1. An orthodihydroxybenzene composition embodying a hexyl group which group is joined to the benzene nucleus.

2. A method of alkylating catechol which comprises treating catechol with an aliphatic carboxylic acid chloride to form an ester, rearranging the ester into the corresponding ketone by treating with zinc chloride, and subsequently reducing the ketone to form the alkylated pyrocatechol.

LUCAS P. KYRIDES.